(12) United States Patent
Post

(10) Patent No.: US 7,235,768 B1
(45) Date of Patent: Jun. 26, 2007

(54) SOLID STATE VISION ENHANCEMENT DEVICE

(75) Inventor: David L. Post, Fairborn, OH (US)

(73) Assignee: United States of America as represented by the Secretary of the Air Force, Washington, DC (US)

( * ) Notice: Subject to any disclaimer, the term of this patent is extended or adjusted under 35 U.S.C. 154(b) by 220 days.

(21) Appl. No.: 11/065,978

(22) Filed: Feb. 28, 2005

(51) Int. Cl.
*H01J 40/14* (2006.01)

(52) U.S. Cl. ............................. 250/207; 250/214 VT

(58) Field of Classification Search ............... 250/207, 250/214 VT, 330, 332, 333
See application file for complete search history.

(56) References Cited

U.S. PATENT DOCUMENTS

| | | |
|---|---|---|
| 5,565,729 A | 10/1996 | Faris et al. |
| 6,230,046 B1 | 5/2001 | Crane et al. |
| 6,243,155 B1 * | 6/2001 | Zhang et al. ............... 349/199 |
| 6,566,897 B2 * | 5/2003 | Lo et al. ..................... 324/751 |
| 6,747,258 B2 | 6/2004 | Benz et al. |
| 7,102,130 B2 * | 9/2006 | Kerr .......................... 250/330 |

* cited by examiner

*Primary Examiner*—John R. Lee
(74) *Attorney, Agent, or Firm*—AFMCLO/JAZ; Gina S. Tollefson; Gerald B. Hollins

(57) ABSTRACT

A method and device for overcoming drawbacks with commonly used prior art image intensifier tubes by providing a vision enhancement capability useful during daytime as well as nighttime. The method and device of the invention combines a solid-state two-dimensional sensor array, emissive display, and multiple computers where each sensor pixel is connected to a display pixel by an intervening computer and computers are interconnected to form a massively parallel array. Image-processing algorithm selections by the user or device itself are based on analysis of an image and consideration of the specific visual task the user wishes to perform, resulting in image enhancement and manipulation.

18 Claims, 3 Drawing Sheets

SOLID STATE VISION ENHANCEMENT DEVICE

RIGHTS OF THE GOVERNMENT

The invention described herein may be manufactured and used by or for the Government of the United States for all governmental purposes without the payment of any royalty.

BACKGROUND OF THE INVENTION

The invention relates to image processing and more specifically to a solid-state vision enhancement device for night and day vision enhancements.

Image intensifier devices are used to amplify low intensity light or convert non-visible light into readily viewable images. Known prior art image intensifier devices include image intensifier tubes.

Image intensifier tubes are commonly used in head-mounted devices that aid vision at night. Image intensifier tubes are analog devices that integrate the sensor, light amplifier, and display. In a modern Gen-III image intensifier tube, infrared energy impinges upon a photo cathode consisting of GaAs, resulting in the generation of electrons which are then emitted into a microchannel plate. The microchannel plate generates secondary electrons. The secondary electrons exit the microchannel plate and impinge upon a phosphor screen, where photons are produced to create an image. This technology is very mature, has good sensitivity, good spatial and temporal resolution, and low noise.

The present invention overcomes drawbacks with commonly used prior art image intensifier tubes by providing a vision enhancement capability useful during daytime as well as nighttime. The method and device of the invention combines a solid-state two-dimensional sensor array, emissive display, and multiple computers where each sensor pixel is connected to a display pixel by an intervening computer and computers are interconnected to form a massively parallel array. Peripheral computers and electronics provide additional data-processing capability and allow data to flow in and out of the system. The parallel computer array executes image-enhancement algorithms in real time to perform functions such as manipulating image intensity to enhance image contrast and edges, accentuating differences between camouflaged and natural objects, and manipulating spectral differences to aid image interpretation. These enhancements are accomplished by image-processing algorithms, which may be selected, changed, and adjusted by the user or the device itself based on analysis of the image and consideration of the specific visual task the user wishes to perform.

SUMMARY OF THE INVENTION

A method and device for overcoming drawbacks with commonly used prior art image intensifier tubes by providing a vision enhancement capability useful during daytime as well as nighttime. The method and device of the invention combines a solid-state two-dimensional sensor array, emissive display, and multiple computers where each sensor pixel is connected to a display pixel by an intervening computer and computers are interconnected to form a massively parallel array. The computer array executes image-processing algorithms selected by the user or device itself based on analysis of an image and consideration of specific visual tasks the user wishes to perform.

It is therefore an object of the invention to provide a solid-state vision enhancement device.

Another object of the invention is to provide a solid-state vision enhancement device useful during daytime as well as nighttime.

Another object of the invention is to provide a solid-state vision enhancement device that is capable of providing an enhanced image to other, remote users, and integrating data from external sources into the image presented to the user.

These and other objects of the invention are achieved by the description, claims and accompanying drawings and a solid state vision enhancement device comprising:

a substrate;

a display-pixel array layer deposited on said substrate;

a computer array and peripheral electronics layer deposited on said display-pixel array layer;

a sensor-pixel array layer deposited on said computer array and peripheral electronics layer and where signals from said sensor-pixels are processed by said computer array;

a spectral filter layer deposited on said sensor-pixel array layer for receiving light from an outside source;

objective optics for focusing light from said outside source; and eyepiece optics for focusing light produced by said display pixels forming an image transmitted to a viewer's eye.

DETAILED DESCRIPTION

Figure 1:
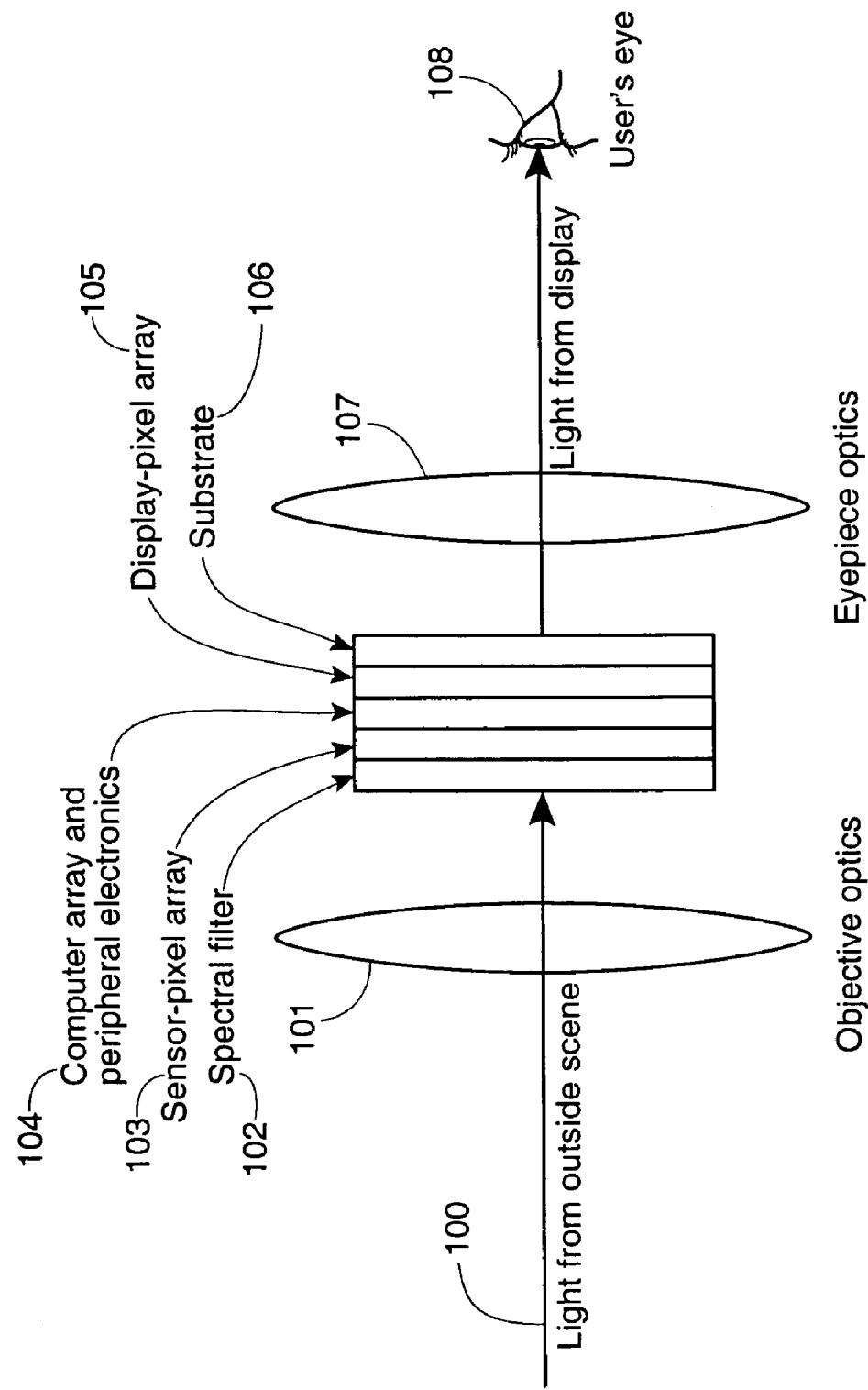
FIG. 1 is a solid state vision enhancement device according to the invention.

FIG. 1 is a diagram illustrating operation of the solid-state vision enhancement device of the invention. Light from the outside scene 100 is focused by the objective optics 101, consisting of one or more lenses, through a spectral filter 102 and onto the sensor-pixel array 103. The spectral filter 102 may be a uniform passive device that provides a single pass band, patterned to provide different pass bands to different sensor pixels, or an active device that adjusts its pass band in response to commands from the peripheral electronics. Signals from the sensor pixels are processed by the computer array 104, which then outputs signals to the display-pixel array 105. The display pixels produce light, which is focused by the eyepiece optics 107, consisting of one or more lenses, to form an image that is transmitted to the viewer's eye 108. All three of the arrays are situated on a substrate 106, such as glass or plastic.

Although the substrate is shown in the preferred arrangement of the invention of FIG. 1 as being at the rear, manufacturing considerations may dictate that it is preferable to place the substrate at the front. Another possible arrangement of the invention that may be preferable for manufacturing purposes is to use two substrates, one bearing the sensor-pixel array and the other bearing the display-pixel array, with the computer array also on one or the other, and then align and mate the two structures. The spectral filter may serve as a substrate.

The sensor-pixel array at 103 in FIG. 1 converts photons to electrons. The number of electrons produced by each sensor pixel in the array is roughly proportional with the number of impinging photons. The computer associated with each sensor pixel measures the number of electrons to determine the radiant energy at that location and then performs computations, based on that number, in accordance with the image-processing algorithms that have been commanded by the peripheral electronics. These computations are, in most cases (but not necessarily) influenced by the number of photons impinging on neighboring sensor pixels, as determined by inter-communications among the neighboring computers. Finally, the output from each computer is converted to a signal that drives one or more display pixels from the display pixel array 105, thereby determining the number of photons emitted by those pixels for detection by the viewer's eye.

Figure 2:
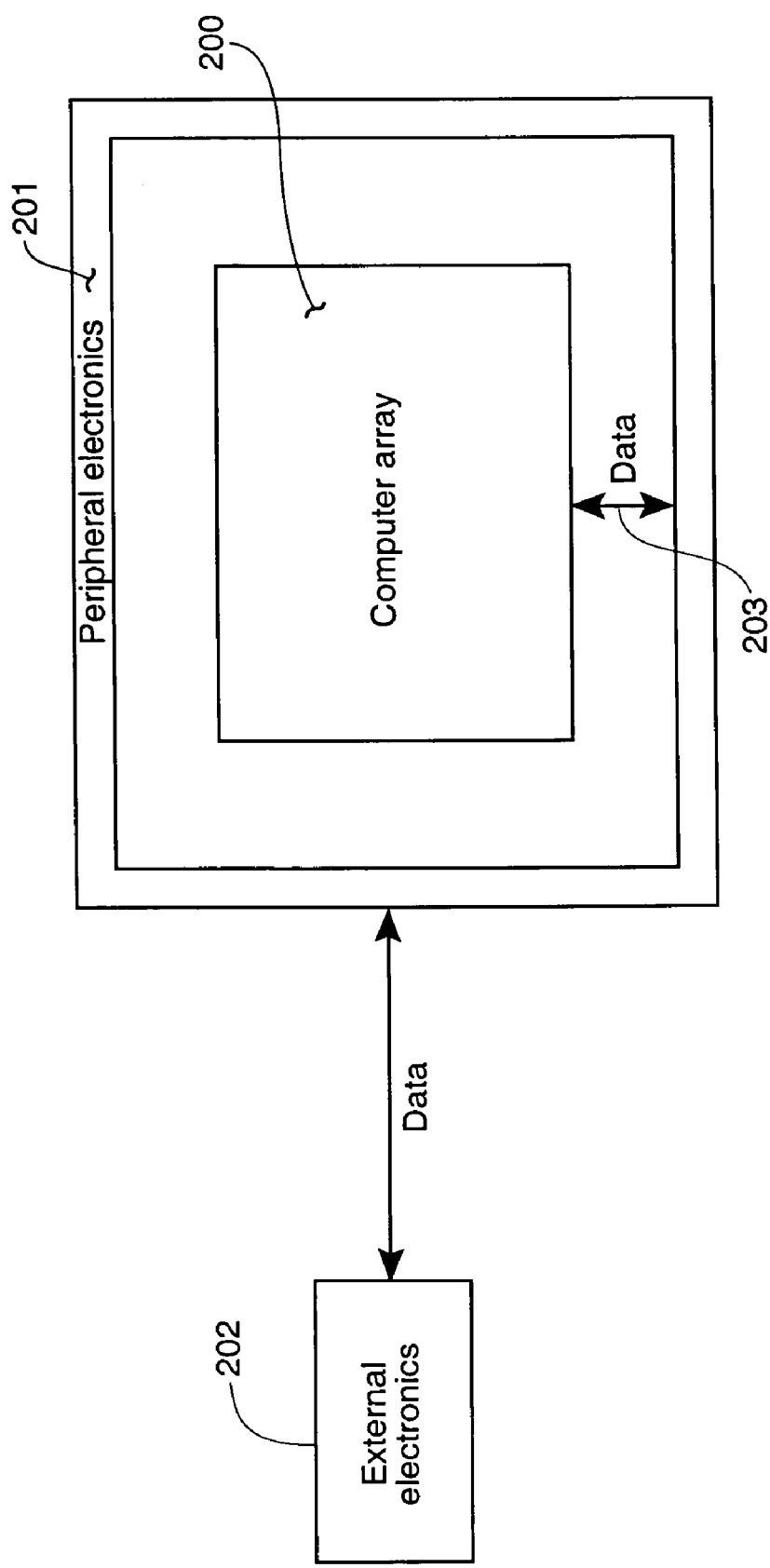
FIG. 2 is a diagram illustrating data flow of the solid state vision enhancement device of FIG. 1.

FIG. 2 is a diagram illustrating data flow of the solid-state vision enhancement device of FIG. 1. FIG. 2 illustrates the computer array 200 and peripheral electronics 201 that are situated together and connected so data 203 can flow between them. The peripheral electronics 201 are connected to external electronics 202, as well. Data sent by the computer array 200 to the external electronics 202 via the peripheral electronics 201 consist typically of images, thereby allowing persons other than the solid-state vision enhancement device user to see what the solid-state vision enhancement device user sees. Data flowing in the opposite direction, that is from the external electronics to the computer array via the peripheral electronics, consist of symbology, graphics, and video, which the computer array 200 processes and combines with the signals from the sensor-pixel array to produce a composite image on the display-pixel array. Data flow may also occur exclusively between the computer array 200 and peripheral electronics 201. For example, the computer array 200 may report the overall signal strength coming from the sensor-pixel array, thus indicating the overall light level of the outside scene, and the peripheral electronics 201 may respond by commanding the computer array to adjust its receptive-field size accordingly, to optimize the signal-to noise ratio of the resulting image. The peripheral electronics 201 also command the computer array 200 to use specific image-processing algorithms, based in part on selections made by the user and communicated via the external electronics, and may transmit those algorithms to the computer array.

Figure 3:
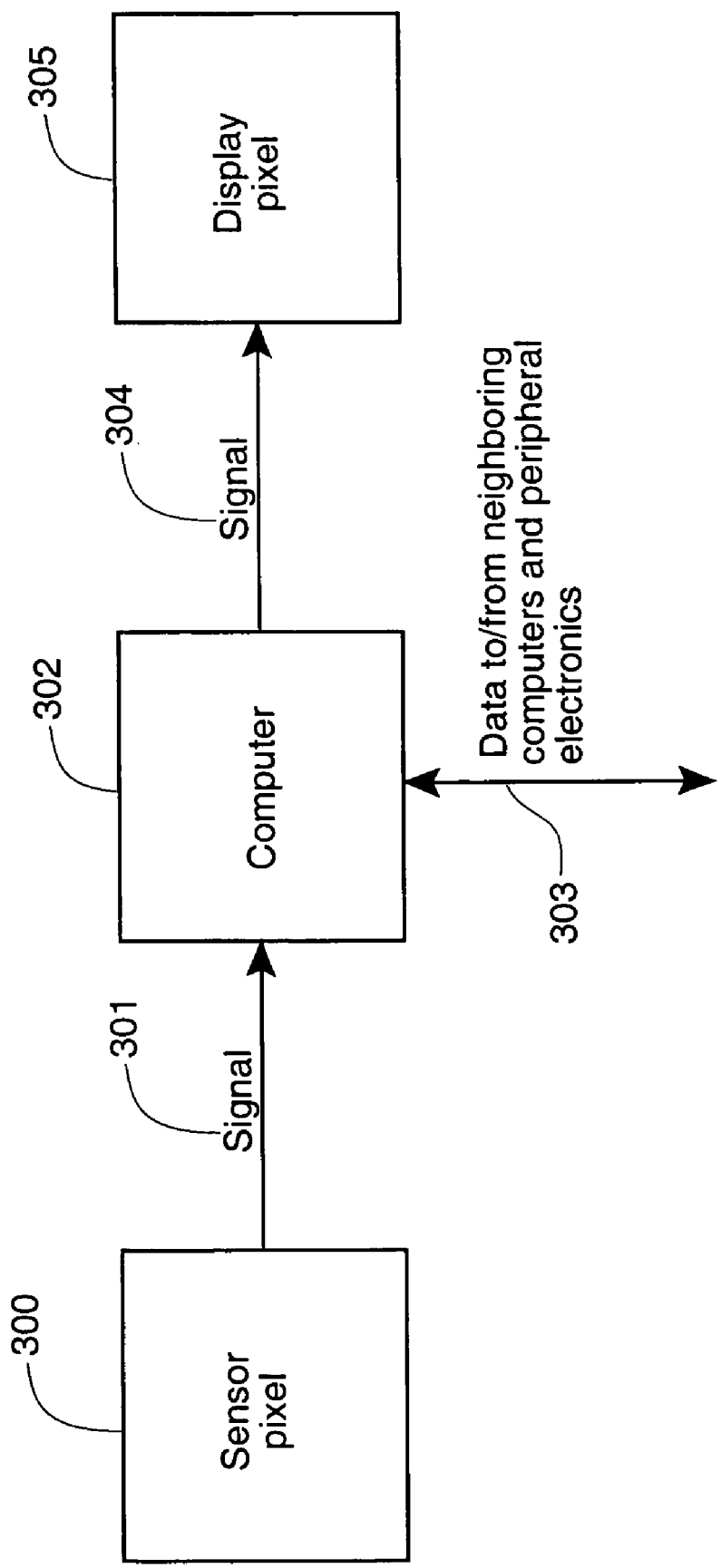
FIG. 3 is a diagram showing sensor and display pixels with an intervening computer.

FIG. 3 is a diagram showing sensor and display pixels with an intervening computer. Each sensor pixel 300 sends a signal 301 to a computer 302, which processes that signal, communicates with neighboring computers 303 about the signals they are receiving from their sensor pixels, and ultimately produces an output signal that drives a display pixel. The number and location of the neighboring computers that are consulted varies with the receptive-field size and the specific processing that occurs depends on the image-processing algorithm(s) that have been commanded by the peripheral electronics. Although the one-to-one relationship among the sensor pixel, computer, and display pixel shown in FIG. 3 is the preferred embodiment, the invention encompasses other possible relationships. For example, three sensor pixels with differing spectral tunings (provided by the filter shown in FIG. 1) may feed one computer, which then drives three display pixels that have different emission spectra, thereby producing a color image.

It is understood that certain modifications to the invention as described may be made, as might occur to one with skill in the field of the invention, within the scope of the appended claims. All embodiments contemplated hereunder which accomplish the objects of the invention have therefore not been shown in complete detail. Other embodiments may be developed without departing from the spirit of the invention or from the scope of the appended claims.

What is claimed is:

1. A solid state vision enhancement device comprising:
   a substrate;
   a display-pixel array layer deposited on said substrate;
   a computer array and peripheral electronics layer deposited on said display-pixel array layer;
   a sensor-pixel array layer deposited on said computer array and peripheral electronics layer containing image-processing algorithms and where signals from said sensor-pixels are communicated to and processed by associated computers in said computer array producing an output signal that drives said display pixel array;
   a spectral filter layer deposited on said sensor-pixel array layer for receiving light from an outside source;
   objective optics for focusing light from said outside source; and
   eyepiece optics for focusing light produced by said display pixels forming an image transmitted to a viewer's eye.

2. The solid state vision enhancement device of claim 1 wherein said computer array and peripheral electronics layer further comprises image processing algorithms selectable by a user or said solid state vision enhancement device and responsive to image analysis and knowledge of a specific visual task resulting in image enhancement.

3. The solid-state device of claim 1 wherein said objective optics comprises one or more lenses.

4. The solid-state device of claim 1 wherein said eyepiece optics comprises one or more lenses.

5. The solid-state device of claim 1 wherein said spectral filter is a uniform passive device providing a single pass band or patterned to provide different pass bands to different sensor pixels.

6. The solid-state device of claim 1 wherein said spectral filter is an active device that adjusts its pass band in response to commands from peripheral electronics.

7. The solid-state device of claim 1 wherein said substrate is glass.

8. The solid-state device of claim 1 wherein said substrate is plastic.

9. The solid-state device of claim 1 wherein said computer array and peripheral electronics layer further comprises external electronics connected to said peripheral electronics whereby data communicates from said computer array through said peripheral electronics to said external electronics.

10. The solid-state device of claim 9 wherein said data includes images thereby allowing a solid-state vision enhancement device user and others to see said image.

11. The solid state-device of claim 9 wherein data are transmitted from said external electronics through said peripheral electronics to said computer array including symbology, graphics and video which said computer array processes and combines with signals from said sensor pixel array to produce a composite image on said display-pixel array.

12. A method for solid-state vision enhancement comprising the steps of:
   receiving optical signals;
   transmitting said signals to a sensor pixel array;
   first sending signals from pixels in said sensor pixel array to associated computers in a computer array;

second sending signals from said computer array to peripheral electronics to process and generate a composite image;

outputting the composite image signal from said second sending step; and using said composite image signal for driving a display pixel array.

13. The method of claim 12 for solid-state vision enhancement wherein said receiving step further comprises the steps of:

focusing light from an outside source through objective optics;

filtering focused light through a spectral filter;

communicating data from said processing step.

14. The method of claim 13 wherein said filtering step further comprises the step of filtering focused light through a uniform pass band spectral filter or one patterned to provide different pass bands to different sensor pixels.

15. The method of claim 13 wherein said filtering step further comprises the step of filtering focused light through an active spectral filter adjusting its pass band in response to commands from said peripheral electronics.

16. The method of claim 12 further comprising the step of communicating data from computer with a plurality of neighboring computers combining graphics, symbology and video with signals from said sensor pixel array to produce a composite image.

17. The method of claim 12 wherein said sending step further comprises the step of:

monitoring sensor-pixel array signal strength indicating light level of outside scene to peripheral electronics; and communicating to sensor-pixel array adjustment requirements of receptive field size for optimized signal to noise ratio of display-pixel array composite image by said peripheral electronics.

18. The method of claim 17 wherein said communicating step further comprises the step of communicating to sensor-pixel array requirements for usage of specific image-processing algorithms based on selections made by a system user.

* * * * *